United States Patent
Iyoha et al.

(10) Patent No.: US 10,859,260 B2
(45) Date of Patent: Dec. 8, 2020

(54) REDUCED FOULING IN STAGED COMBUSTION

(71) Applicants: Osemwengie Uyi Iyoha, Fayetteville, GA (US); Jesse E Cates, Brownsburg, IN (US)

(72) Inventors: Osemwengie Uyi Iyoha, Fayetteville, GA (US); Jesse E Cates, Brownsburg, IN (US)

(73) Assignee: Praxair Technology, Inc., Danbury, CT (US)

( * ) Notice: Subject to any disclaimer, the term of this patent is extended or adjusted under 35 U.S.C. 154(b) by 105 days.

(21) Appl. No.: 16/135,319

(22) Filed: Sep. 19, 2018

(65) Prior Publication Data

US 2019/0113222 A1 Apr. 18, 2019

Related U.S. Application Data

(60) Provisional application No. 62/571,934, filed on Oct. 13, 2017.

(51) Int. Cl.
| | | |
|---|---|---|
| *F23C 6/04* | (2006.01) | |
| *F23D 14/32* | (2006.01) | |
| *F23L 7/00* | (2006.01) | |
| *C03B 5/235* | (2006.01) | |

(52) U.S. Cl.
CPC ............ *F23C 6/047* (2013.01); *C03B 5/2353* (2013.01); *F23D 14/32* (2013.01); *F23L 7/007* (2013.01); *F23C 2201/101* (2013.01); *F23C 2201/102* (2013.01); *F23C 2201/30* (2013.01); *F23C 2900/06041* (2013.01)

(58) Field of Classification Search
CPC ............... F23C 6/047; F23C 2201/101; F23C 2201/30; F23C 2201/102; F23C 6/045; F23C 2201/20; F23C 2900/06041; F23L 7/007; F27D 2099/0046; F23D 14/32; C03B 5/2353
See application file for complete search history.

(56) References Cited

U.S. PATENT DOCUMENTS

| | | | | |
|---|---|---|---|---|
| 3,074,707 A | * | 1/1963 | Humphries | ............... C04B 7/44 106/743 |
| 3,916,805 A | * | 11/1975 | Kalfadelis | .......... B01D 53/8625 110/345 |
| 4,473,388 A | * | 9/1984 | Lauwers | ............... C03B 5/2353 65/134.4 |
| 4,474,121 A | * | 10/1984 | Lewis | ...................... F23N 1/02 110/346 |
| 4,599,100 A | * | 7/1986 | Demarest, Jr. | .......... C03B 5/235 65/134.4 |
| 5,267,850 A | * | 12/1993 | Kobayashi | .............. C03B 5/235 431/187 |
| 5,346,390 A | | 9/1994 | Slavejkov et al. | |

(Continued)

*Primary Examiner* — Jorge A Pereiro
(74) *Attorney, Agent, or Firm* — Donald T. Black

(57) ABSTRACT

In staged combustion, wherein fuel is fed into a furnace, and less than all of the gaseous oxidant needed to completely combust the fuel is fed with the fuel and combusted, providing uncombusted fuel, and the remaining portion of gaseous oxidant needed to combust the fuel is fed into the furnace through a second port, fuel is fed and combusted at the second port to heat the second port and lessen the tendency of deposits to form at the second port.

6 Claims, 3 Drawing Sheets

(56) References Cited

U.S. PATENT DOCUMENTS

| | | | |
|---|---|---|---|
| 5,387,100 A * | 2/1995 | Kobayashi | F23C 6/045 |
| | | | 431/10 |
| 5,431,559 A | 7/1995 | Taylor | |
| 5,439,373 A * | 8/1995 | Anderson | F23C 6/045 |
| | | | 431/10 |
| 5,601,425 A * | 2/1997 | Kobayashi | F23C 1/00 |
| | | | 431/8 |
| 5,611,682 A | 3/1997 | Slavejkov et al. | |
| 5,755,818 A * | 5/1998 | Tuson | C03B 5/235 |
| | | | 431/10 |
| 5,924,858 A * | 7/1999 | Tuson | C03B 5/235 |
| | | | 431/10 |
| 5,931,654 A | 8/1999 | Chamberland et al. | |
| 6,113,386 A * | 9/2000 | Shannon | C21D 1/52 |
| | | | 432/146 |
| 6,123,542 A | 9/2000 | Joshi et al. | |
| 6,132,204 A | 10/2000 | Snyder et al. | |
| 6,237,369 B1 | 5/2001 | Leblanc et al. | |
| 6,394,790 B1 | 5/2002 | Kobayashi | |
| 2001/0039813 A1 | 11/2001 | Simpson et al. | |
| 2006/0057517 A1 | 3/2006 | Joshi et al. | |

\* cited by examiner

REDUCED FOULING IN STAGED COMBUSTION

RELATED APPLICATIONS

This application claims the benefit of U.S. Provisional Application Ser. No. 62/571,934, filed on Oct. 13, 2017, which is incorporated herein by reference.

FIELD OF THE INVENTION

The present invention relates to combustion in industrial furnaces such as glassmelting furnaces, cement kilns, incinerators, and the like. It also relates to combustion which is staged to lessen the formation of nitrogen oxides.

BACKGROUND OF THE INVENTION

Staged combustion is used in furnaces, for example oxy-fuel glass furnaces, to reduce NOx generation and emissions. In staged combustion, fuel and gaseous oxidant are introduced into a combustion zone in a sub-stoichiometric ratio and combusted. By sub-stoichiometric is meant that the amount of gaseous oxidant that is introduced with the fuel is not enough to completely combust the fuel that is fed. The low oxygen and nitrogen concentrations in close proximity to the high temperature flame reduces the amount of NOx that is formed. The balance of the amount of oxidant (referred to herein as "staging oxygen") that is required to complete the combustion of the fuel is introduced at a different location within the combustion unit. However, it has been found that when staged oxy-fuel combustion is carried out, the port opening from which the staging oxygen is fed is highly susceptible to the fouling and deterioration, thereby rapidly plugging this port opening.

The present invention solves these drawbacks of staged combustion.

BRIEF SUMMARY OF THE INVENTION

One aspect of the present invention is a method of combusting fuel in a furnace, comprising:
(A) feeding a first stream of fuel into the furnace, feeding a first stream of gaseous oxidant into the furnace in an amount that provides less oxygen than the amount of oxygen that is required to completely combust the fuel that is fed in said first stream of fuel, and combusting the fuel in the first stream of fuel with the oxygen in the first stream of gaseous oxidant in the furnace to produce a mixture of combustion products and incompletely combusted fuel;
(B) feeding a second stream of fuel into the interior space of a port which is recessed in a wall of the furnace and which opens toward the furnace interior, and feeding a second stream of gaseous oxidant into the interior space of the port in an amount that provides a stoichiometric excess of oxygen relative to the fuel that is fed in the second stream of fuel, and combusting the fuel and gaseous oxygen that are fed into the interior space of the port in a flame whose base is within the port, to heat the port to at least 1500 F and to produce a second mixture, comprising products of said combustion and unreacted oxygen from the second stream of oxidant, that is at a temperature of at least 1500 F and fills the second port; and
(C) passing the second mixture into the furnace and combusting incompletely combusted fuel in the furnace with said unreacted oxygen.

A preferred embodiment of the invention is a method of producing molten glass, comprising
feeding glassmaking ingredients that contain material selected from the group consisting of oxides, hydroxides, silicates and sulfates of sodium and potassium, and mixtures thereof, into a glassmelting furnace, and melting the glassmaking ingredients in the furnace by heat of combustion that is generated by
(A) feeding a first stream of fuel into the furnace, feeding a first stream of gaseous oxidant into the furnace in an amount that provides less oxygen than the amount of oxygen that is required to completely combust the fuel that is fed in said first stream of fuel, and combusting the fuel in the first stream of fuel with the oxygen in the first stream of gaseous oxidant in the furnace to produce a mixture of combustion products and incompletely combusted fuel;
(B) feeding a second stream of fuel into the interior space of a port which is recessed in a wall of the furnace and which opens toward the furnace interior, and feeding a second stream of gaseous oxidant into the interior space of the port in an amount that provides a stoichiometric excess of oxygen relative to the fuel that is fed in the second stream of fuel, and combusting the fuel and gaseous oxygen that are fed into the interior space of the port in a flame whose base is within the port, to heat the port to at least 1500 F and to produce a second mixture, comprising products of said combustion and unreacted oxygen from the second stream of oxidant, that is at a temperature of at least 1500 F and fills the second port; and
(C) passing the second mixture into the furnace and combusting incompletely combusted fuel in the furnace with said unreacted oxygen.

DETAILED DESCRIPTION OF THE INVENTION

The present invention is useful in any furnace of the type that includes an enclosed space in which combustion occurs to heat material that is present in the enclosed space. The heat can be used to melt or fuse material, such as with glassmelting furnaces and cement kilns, or to incinerate material, such as with incinerators. As described below, one preferred application is with glassmelting furnaces, especially glassmelting furnaces that melt material that is prone to emanation of substances that can condense onto surfaces at the burners and their associated ports.

The present invention is implemented in furnaces wherein the aforementioned first stream of fuel and the aforementioned first stream of gaseous oxidant are fed toward the furnace interior through one or more than one openings which are referred to in the description herein as outlets, and wherein the aforementioned second stream of fuel and the aforementioned second stream of gaseous oxidant are fed toward the furnace interior through one or more than one openings which are referred to in the description herein as ports.

The furnaces in which the present invention can be implemented can have one to fifty outlets, and can have one to fifty ports, depending on conventional design considerations including the size of the furnace, and the desired distribution of heat of combustion to the material in the furnace that is to be heated or melted. Typically there will be outlets and ports in walls of the furnace that face each other, i.e. on both sides of the furnace. Further preferred arrangements of the outlets and the ports are described herein.

Figure 3:
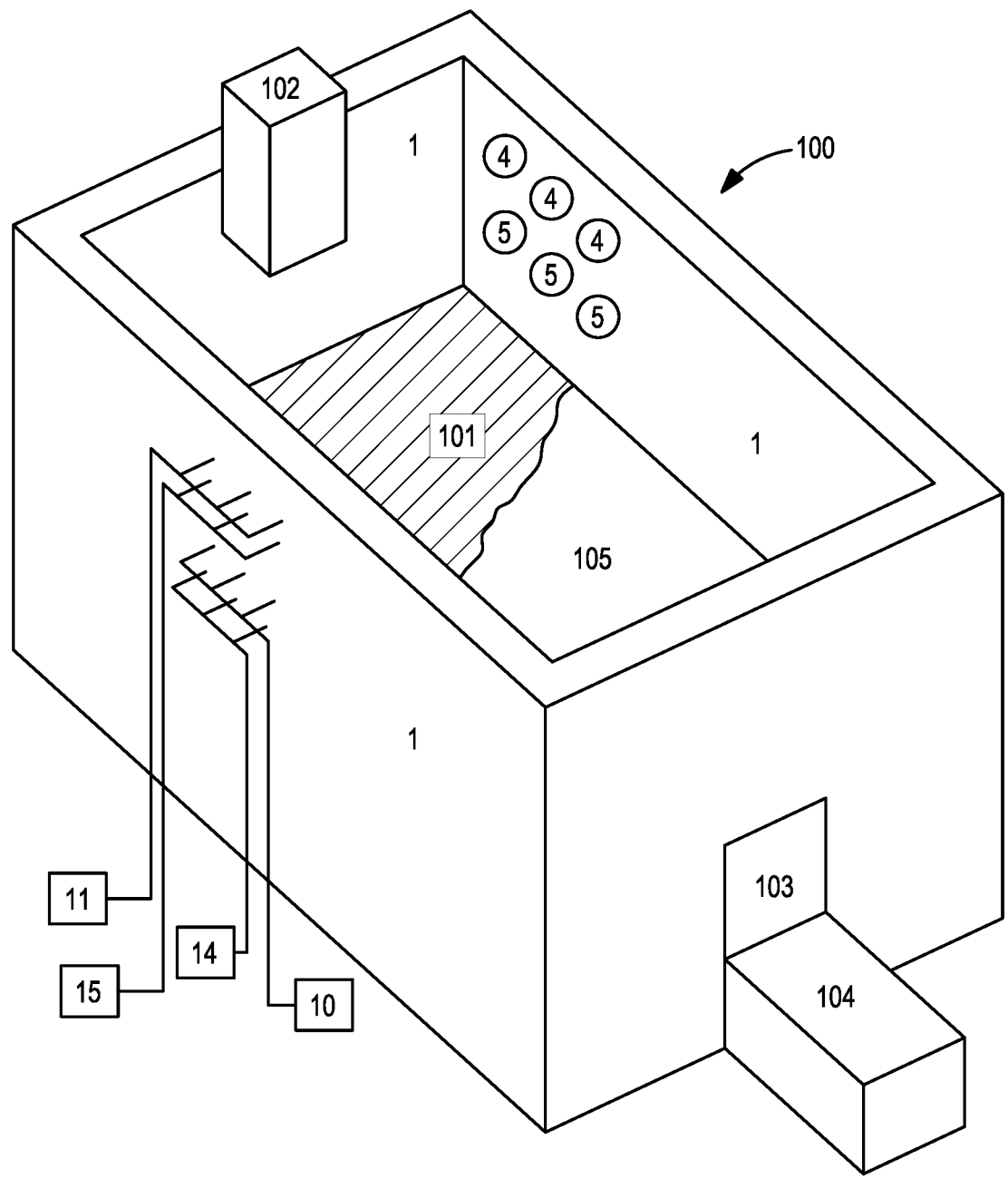
FIG. 3 is a perspective view of a furnace with which the present invention can be practiced.

FIG. 3 shows a representative furnace 100 with which the present invention can be practiced. Walls 1 form the aforementioned enclosed space that holds the material 101 to be heated or melted in the furnace. Typically the furnace also has a roof (not shown, to better illustrate the interior of the furnace) which is supported by the walls and which helps contain the heat that is generated in the furnace. Outlets 4 and ports 5 to which oxidant and fuel are fed and combusted as described herein are shown, as are the respective sources 10 and 11 of oxidant and the sources 14 and 15 of fuel which are described further herein. FIG. 3 shows three outlets 4 and three ports 5 in one wall 1, and the feed lines that extend from sources 10, 11, 14 and 15 indicate the presence of three outlets and three ports in the facing wall 1.

However, furnaces with which the present invention can be implemented may have additional outlets 4 and additional ports 5 along each wall, functioning as described herein.

Figure 1:
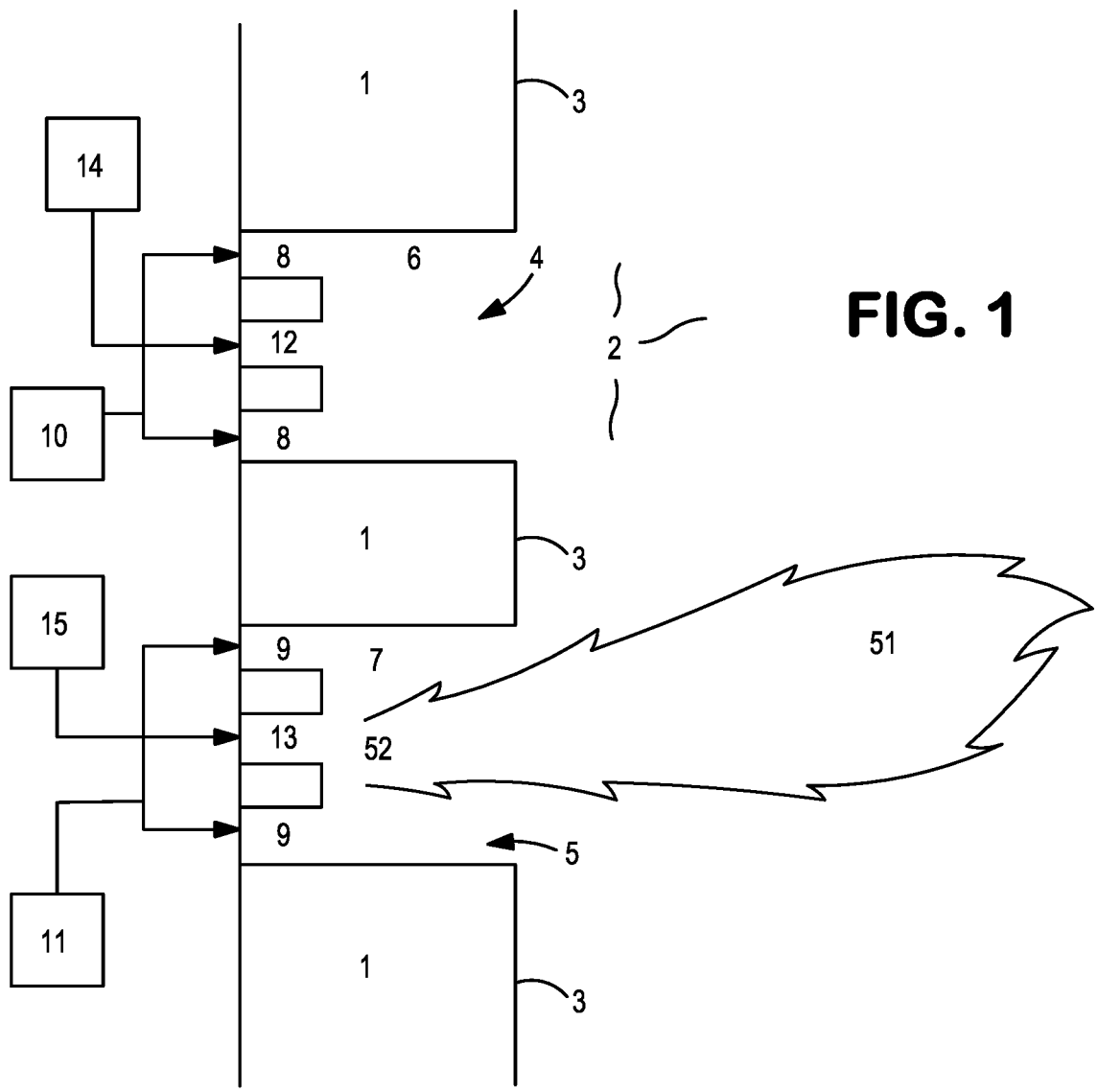
FIG. 1 is a cross-sectional view of a portion of a furnace with which the present invention can be practiced.
Figure 2:
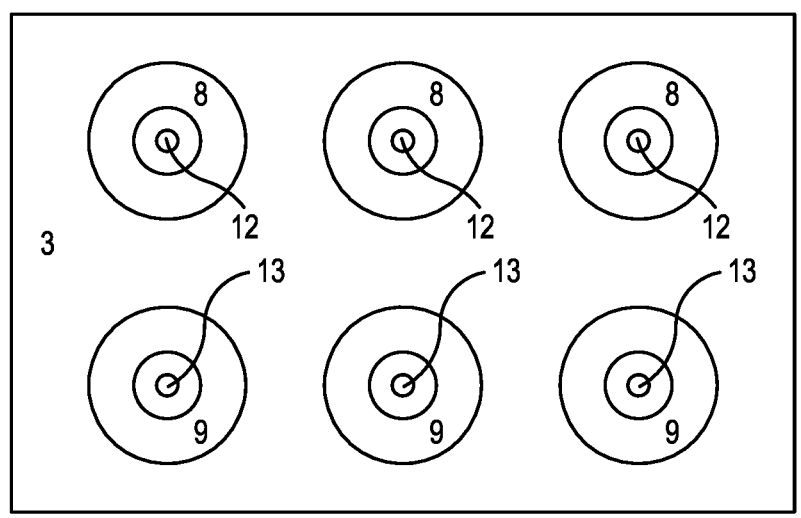
FIG. 2 is a front plan view of a portion of a wall of a furnace with which the present invention can be practiced.

FIGS. 1 and 2 show one representative arrangement of outlets 4 and ports 5 with which this invention can be implemented. FIG. 1 shows in cross-section a portion of a wall 1 which is one of the walls that define the enclosed interior space 2 within which combustion occurs. One representative outlet 4 and one representative port 5 are shown in this cross-section view.

Figure 4:
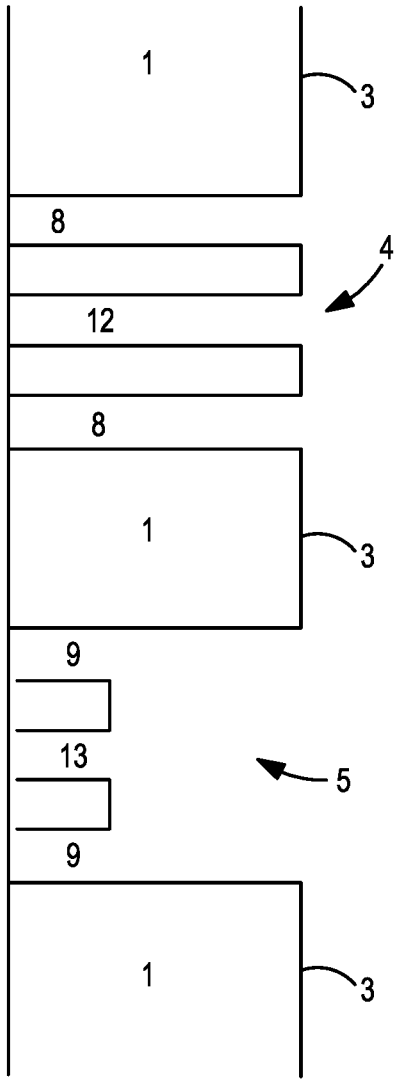
FIG. 4 is a cross-sectional view of a portion of another embodiment of a furnace with which the present invention can be practiced.

In FIG. 1, outlet 4 includes interior space 6 which is recessed from the interior surface 3 of wall 1 and which opens toward interior space 2 of the furnace. The outlets 4 with which the present invention can be implemented can instead be flush with the interior surface 3 of the wall 1, by which is meant that fuel and gaseous oxidant emerge directly into the interior of the furnace from the respective passageways in which they are fed. This embodiment is depicted in FIG. 4.

Port 5 includes interior space 7 which is recessed from the interior surface 3 and which opens toward interior space 2. In this embodiment shown in FIGS. 1 and 2, outlet 4 is positioned at a higher elevation than port 5. Preferably outlet 4 is vertically directly above port 5, as shown in FIG. 2. If more than one outlet is present, they are preferably arrayed in the same horizontal plane as each other, as shown in FIG. 2. Similarly, if more than one port is present, they are preferably arrayed in the same horizontal plane as each other, as shown in FIG. 2.

Figure 5:
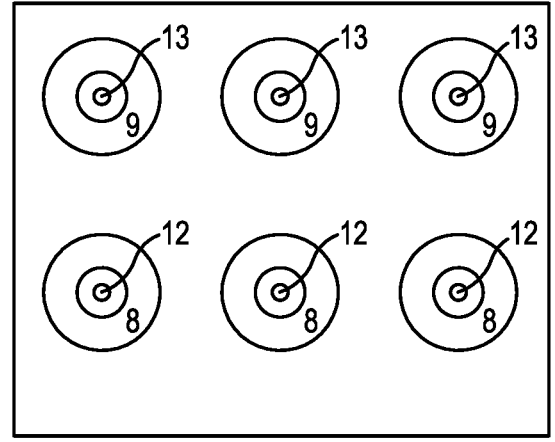
FIG. 5 is a front plan view of a portion of a wall of another embodiment of a furnace with which the present invention can be practiced.
Figure 6:
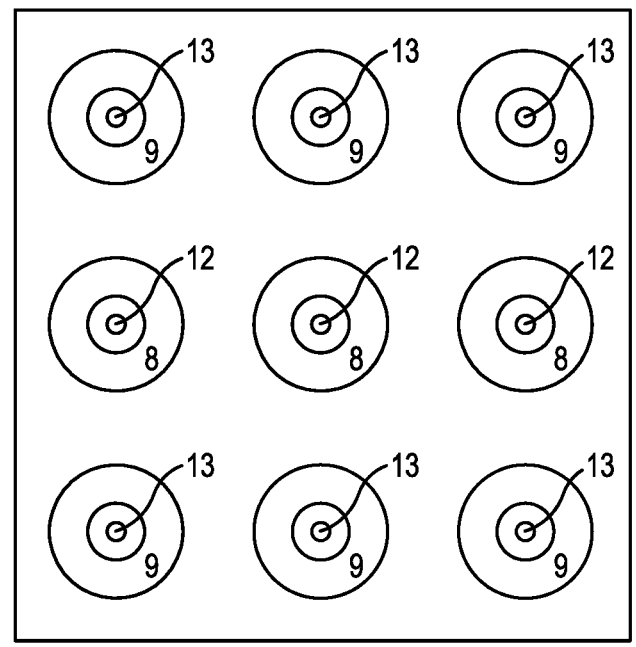
FIG. 6 is a front plan view of a portion of a wall of yet another embodiment of a furnace with which the present invention can be practiced.

In other embodiments, the ports 5 can be above the outlets 4, as shown in FIG. 5. FIG. 6 depicts another possible embodiment in which the present invention can be implemented, in which each outlet 4 is associated with two ports 5, one of which is above an outlet 4 and one of which is below the outlet 4. In any of the embodiments, the outlets 4 and the ports 5 are fed fuel and gaseous oxidant from sources thereof in the same manner as described herein with respect to FIGS. 1 and 3.

Turning again to FIG. 1, outlet 4 includes oxidant outlet 8 from which gaseous oxidant enters space 6. This gaseous oxidant is fed from a suitable source 10 which can open and close the flow of oxidant and which controls the rate of flow and the velocity of the flow of oxidant into space 6. Outlet 4 also includes fuel outlet 12 from which fuel enters space 6. This fuel is fed from a suitable source 14 which can open and close the flow of fuel and which controls the rate of flow and the velocity of the flow of the fuel into space 6. Outlet 8 is preferably an annular space, concentric with and surrounding outlet 12, as shown in FIG. 2.

Port 5 includes oxidant outlet 9 from which gaseous oxidant enters space 7. This gaseous oxidant is fed from a suitable source 11 which can open and close the flow of oxidant and which controls the rate of flow and the velocity of the flow of oxidant into space 7. Port 5 also includes fuel outlet 13 from which fuel enters space 7. This fuel is fed from a suitable source 15 which can open and close the flow of fuel and which controls the rate of flow and the velocity of the flow of the fuel into space 7. Oxidant outlet 9 is preferably an annular space, concentric with and surrounding fuel outlet 13, as shown in FIG. 2. The same source can provide gaseous oxidant that is fed to oxidant outlets 8 and 9, so long as the rates of flow of oxidant to outlets 8 and 9 can be separately controlled. The same source can provide fuel that is fed to fuel outlets 12 and 13, so long as the flows of fuel to fuel outlets 12 and 13 can be separately controlled.

The aforementioned outlets and ports can be formed in the existing wall 1 of a furnace, or they can be formed in a preassembled burner block which is fitted into a corresponding space in wall 1 and attached to the respective sources 10, 11, 14, and 15. In either embodiment, the interior spaces 6 (when present) and 7 are typically 3 to 10 inches in depth measured from the interior surface 3 of the closest wall 1 of the furnace. The wall 1 in which the outlets 4 and ports 5 are present, and the burner block if a burner block is employed, should be constructed of material that is capable of withstanding temperatures in excess of 1500 F, up to 3500 F, without melting or disintegrating. Materials that are suitable for such use are well known in the field of high temperature furnaces and include refractory inorganic materials such as AZS.

The oxidant fed to oxidant outlets 8 and 9 each is preferably at least 70 vol. % oxygen, more preferably at least 90 vol. % oxygen.

Suitable fuel to feed to fuel outlets 12 and 13 is preferably any hydrocarbon or mixture of hydrocarbons that is gaseous at 25 C. Examples include natural gas, methane, ethane, propane, and butane, and mixtures thereof.

In operation, gaseous oxidant and fuel are fed from their respective sources to the outlets 4, and out of their respective outlets 8 and 12, into the interior space 6 of outlet 4 (in the embodiment of FIG. 1) or directly into the furnace interior (in the embodiment of FIG. 4), and are combusted. The fuel and oxidant that are fed to outlet or outlets 4 are fed at relative rates such that there is a stoichiometric excess of fuel relative to the amount of oxygen that is fed to the outlet or outlets 4. That is, the amount of oxygen that is present in the oxidant fed to the outlets 4 should be less than the amount of oxygen that would be required to completely combust (that is, to convert fully to $H_2O$ and $CO_2$) all of the fuel that is fed to the outlets 4. The amount of oxygen in the oxidant stream fed to the outlets 4 should be 5% to 50% of the amount of oxygen required for complete combustion of the fuel that is fed to the outlets 4, and is preferably in the range of 20% to 36% of the amount of oxygen required for complete combustion of the fuel that is fed to the outlets 4. The appropriate stoichiometric ratios can readily be satisfied based on knowledge of the oxygen content of the oxidant streams, and the flow rates of the oxidant and fuel streams.

Typical flow rates at the outlets 4 are: oxidant, 10 to 50 feet per second; and fuel, 70 to 250 feet per second.

The combustion of fuel and oxidant fed at the outlets 4 produces in the furnace a mixture of combustion products that includes incompletely combusted fuel, which as used herein means matter selected from the group consisting of hydrocarbons as described above which have not reacted at all with oxygen, carbon monoxide, elemental carbon, and partially oxidized hydrocarbons. This mixture of combustion products is at a temperature typically of 1500 F to 2800 F.

While the combustion is occurring at the outlets 4, fuel and gaseous oxidant are also fed to the ports 5. That is, gaseous oxidant and fuel are fed from their respective sources, out of their respective outlets 9 and 13 into the recessed interior space 7 of port 5, and are combusted to form a flame 51 whose base 52 is within interior space 7 and which extends into interior space 2 of the furnace. The fuel and oxidant that are fed into interior space 7 are fed at relative rates such that there is a stoichiometric excess of oxygen relative to the fuel that is fed into space 7. That is, the oxidant that is fed into interior space 7 should be fed at a rate (taking into account the oxygen content of the gaseous oxidant which is being fed) that provides enough oxygen to completely combust (that is, to convert fully to $H_2O$ and $CO_2$) all of the fuel that is fed into space 7, as well as additional oxygen to combust with the incompletely combusted fuel that is in the mixture of combustion products that is produced by the combustion at outlets 4. Of the fuel that is fed into port 5, 20% to 95% of this fuel combusts in the interior space 7, and the remainder combusts in the furnace. The combustion in interior space 7 produces a hot mixture of oxygen and combustion products (and any uncombusted fuel) which has a temperature of 1500 F to 3500 F and which fills interior space 7 and passes into the furnace.

The appropriate stoichiometric ratios of oxygen to feed to the ports 5 can readily be established from the oxygen content of the oxidant, the flow rates of the oxidant to the ports 5, and the flow rates of the fuel streams fed to both the ports.

A typical flow rate at the ports 5 of the oxidant is 10 to 60 feet per second. The flow rate of the fuel into the ports 5 should be at least 100 feet per second, typically 100 to 1000 feet per second, and preferably 300 to 700 feet per second. The velocity of this fuel aids in providing adequate heat transfer to the furnace.

For overall efficiency of the furnace operation, the total amount of oxygen that is provided in the oxidant streams which are fed to the outlets 4 and the ports 5 should be sufficient to completely combust all of the fuel that is fed to the outlets 4 and the ports 5. Staging the combustion of the fuel that is fed to the furnace, by combusting only partially the fuel that is fed to the outlets 4 and passing incompletely combusted fuel into the furnace, and then more completely combusting the incompletely combusted fuel with oxygen that enters the furnace from the ports 5, results in lower formation of NOx (by which is meant oxides of nitrogen and mixtures of oxides of nitrogen) compared to the NOx formation that would result from combusting all of the fuel at only the outlets 4. For purposes of staging combustion and reducing NOx formation, from 20 vol. % to 30 vol. % of the oxygen that combusts the fuel that is fed to the furnace should be fed to the outlets 4, and the remainder of the oxygen should be fed through the ports 5. Furthermore, relative to the total amount of fuel that is fed to the outlets and ports, it is preferred that 5 vol. % to 50 vol. % of the fuel is fed to the ports. The ability of the invention to achieve this reduced formation of NOx is enhanced by spacing the ports 5 about 3 to 12 inches from the outlets 4.

The amount of fuel that is fed into each port 5 and combusted there should be sufficient to maintain the temperature in interior space 7 at a temperature of 1500 F or higher, but not so high to cause melting or disintegration of the solid material from which port 5 is formed. Combusting fuel at the port 5 elevates the temperature within the interior 7 of the port 5 and elevates the temperature of the surfaces within the interior space 7 as well as the surfaces 3 of the furnace where interior space 7 intersects the surfaces 3. This elevation of the temperature at these locations provides numerous advantages.

One notable advantage is that the formation of solid deposits in the interior space 7 and on the surfaces 3 is reduced or eliminated. It has been determined by the inventors that during operation of the furnace, which brings the interior of the furnace to temperatures of 1500 F to 3500 F, substances in the atmosphere within the furnace which are in the gaseous state, or are in finely divided suspended particulate state, may condense onto surfaces in the interior space 7 or onto surfaces 3 because feeding oxidant into and through second port 5 causes those surfaces to be relatively cooler than the rest of the furnace atmosphere. Whether these condensed deposits are solids or liquids, the formation of deposits leads to operational difficulties such as narrowing and plugging of openings, loss of uniformity of the flame, pressure variability, and pieces of deposits falling into the molten glass 104 and damaging the quality or uniformity of the molten glass 104.

The advantage of the present invention, that the formation of such deposits is reduced or eliminated, is particularly valuable in the operation of glassmelting furnaces, because glassmaking materials that are typically fed into glassmaking furnaces and are melted therein often contain materials that upon being heated to glassmelting temperatures form products including oxides, hydroxides and/or sulfates of sodium and/or potassium, or even fully reduced metallic sodium and/or potassium. These products can enter the gaseous atmosphere in the furnace, and then could condense to form the aforementioned deposits on surfaces of the furnace in and at the second port 5.

Thus, a particularly preferred aspect of the present invention is a method of operating a glassmelting furnace wherein glassmaking materials that contain material selected form the group consisting of oxides, hydroxides, silicates, and carbonates of sodium and oxides, hydroxides, silicates, and carbonates of potassium, and mixtures thereof, are fed into a furnace and melted by heat of combustion of fuel, wherein the combustion includes combusting fuel and oxidant in the manner described herein using staged combustion carried out at first and second ports at which fuel is combusted at both the first and second ports as described herein.

A particularly preferred implementation of the present invention is in the manufacture of glass, as will now be described. Referring again to FIG. 3, furnace 100 includes walls 1 and outlets 4 and ports 5 as described herein. Glassmaking material 101 is fed into the furnace at feed station 102. Typical glassmaking ingredients include soda ash, niter, silica, sodium silicate, and/or pieces of broken glass ("cullet"). The heat of combustion in furnace 100 melts the glassmaking material 101 and forms molten glass 105, which is withdrawn from furnace 100 at discharge station 103 for further processing represented by 104 which may include fining and other steps that are conventional in the manufacture of glass.

The temperature in the interior of the glassmelting furnace is high enough that some gaseous substances can emanate from the molten glass 105 into the atmosphere inside the furnace above the molten glass 105. These gaseous substances may include any one or more of sodium hydroxide, sodium oxide, potassium hydroxide, potassium oxide, elemental sodium vapor, elemental potassium vapor, or other substances that are gaseous at temperatures of 1500 F or higher and that are liquid or solid at temperatures below 1500 F. Operation of the combustion using outlets 4 and ports 5 as described herein inhibits or prevents condensation of these gaseous substances as liquids or solids onto surfaces within the outlets 4 and within the ports 5 and inhibits or prevents such condensation onto the surfaces 3 where the openings 6 and 7 intersect with surfaces 3 of the furnace.

The present invention thus enables these advantages to be realized when the gaseous oxidant that is fed into the ports 5 is at ambient temperature, that is, temperature of 20 C to 40 C. That is, it is not necessary to preheat the gaseous oxidant that is fed into the ports 5.

Preferred operating conditions of this invention are set forth in the following Table 1:

| Parameter | minimum | Preferred range | maximum |
| --- | --- | --- | --- |
| Velocity of fuel into second port (ft/s) | 100 | 300 to 700 | 1000 |
| Ratio of fuel amount fed into second port to total fuel amount fed to first and second ports (%) | 0.05 | 0.1 to 0.3 | 0.5 |
| Velocity of oxidant fed into second port (ft/s) | 10 | 20 to 50 | 100 |
| Ratio of oxygen amount in oxidant fed into second port to total oxygen amount fed to first and second ports (%) | 25 | 50 to 80 | 90 |
| Combustion heat release within second port (%) | 20 | 30 to 80 | 95 |
| Distance from fuel outlet in second port to second port opening in furnace interior wall (inches) | 3 | 3 to 8 | 10 |

What is claimed is:

1. A method of combusting fuel in a furnace, comprising:
   (A) feeding a first stream of fuel from an outlet in a wall of a furnace into the furnace, feeding a first stream of gaseous oxidant from said outlet into the furnace in an amount that provides less oxygen than the amount of oxygen that is required to completely combust the fuel that is fed in said first stream of fuel, and combusting in the furnace the fuel in the first stream of fuel with the oxygen in the first stream of gaseous oxidant to produce a mixture of combustion products and incompletely combusted fuel;
   (B) feeding a second stream of fuel into the interior space of a port which is recessed in a wall of the furnace and which opens toward the furnace interior, and feeding a second stream of gaseous oxidant into the interior space of the port in an amount that provides a stoichiometric excess of oxygen relative to the fuel that is fed in the second stream of fuel, and combusting within the interior space of the port the fuel and gaseous oxygen that are fed into the interior space of the port in a flame whose base is within the port, to heat the port to at least 1500 F and to produce a second mixture, comprising products of said combustion and unreacted oxygen from the second stream of oxidant, that is at a temperature of at least 1500 F and fills the interior space of the port; and
   (C) passing the second mixture into the furnace and combusting incompletely combusted fuel in the furnace with said unreacted oxygen.

2. A method according to claim 1 wherein in step (B) said combusting within the interior space of the port of the fuel and gaseous oxygen that are fed into the interior space of the port in a flame whose base is within the port, heats the port to at least 1500 F, and provides combustion heat release within the port of 30% to 95%, and produces said second mixture, comprising products of said combustion and unreacted oxygen from the second stream of oxidant, that is at a temperature of at least 1500 F and fills the interior space of the port.

3. A method according to claim 1 wherein in step (B) said combusting within the interior space of the port of the fuel and gaseous oxygen that are fed into the interior space of the port in a flame whose base is within the port, heats the port to at least 1500 F, and provides combustion heat release within the port of 80% to 95%, and produces said second mixture, comprising products of said combustion and unreacted oxygen from the second stream of oxidant, that is at a temperature of at least 1500 F and fills the interior space of the port.

4. A method of producing molten glass, comprising:
   feeding glassmaking ingredients that contain material selected from the group consisting of oxides, hydroxides, silicates and sulfates of sodium and potassium, and mixtures thereof, into a glassmelting furnace, and melting the glassmaking ingredients in the furnace by heat of combustion that is generated by
   (A) feeding a first stream of fuel from an outlet in a wall of a furnace into the furnace, feeding a first stream of gaseous oxidant from said outlet into the furnace in an amount that provides less oxygen than the amount of oxygen that is required to completely combust the fuel that is fed in said first stream of fuel, and combusting in the furnace the fuel in the first stream of fuel with the oxygen in the first stream of gaseous oxidant to produce a mixture of combustion products and incompletely combusted fuel;
   (B) feeding a second stream of fuel into the interior space of a port which is recessed in a wall of the furnace and which opens toward the furnace interior, and feeding a second stream of gaseous oxidant into the interior space of the port in an amount that provides a stoichiometric excess of oxygen relative to the fuel that is fed in the second stream of fuel, and combusting within the interior space of the port the fuel and gaseous oxygen that are fed into the interior space of the port in a flame whose base is within the port, to heat the port to at least and to produce a second mixture, comprising products of said combustion and unreacted oxygen from the second stream of oxidant, that is at a temperature of at least 1500 F and fills the interior space of the port; and
   (C) passing the second mixture into the furnace and combusting incompletely combusted fuel in the furnace with said unreacted oxygen.

5. A method according to claim 4 wherein in step (B) said combusting within the interior space of the port of the fuel and gaseous oxygen that are fed into the interior space of the port in a flame whose base is within the port, heats the port to at least 1500 F, and provides combustion heat release within the port of 30% to 95%, and produces said second mixture, comprising products of said combustion and unreacted oxygen from the second stream of oxidant, that is at a temperature of at least 1500 F and fills the interior space of the port.

6. A method according to claim 4 wherein in step (B) said combusting within the interior space of the port of the fuel and gaseous oxygen that are fed into the interior space of the port in a flame whose base is within the port, heats the port to at least 1500 F, and provides combustion heat release within the port of 80% to 95%, and produces said second mixture, comprising products of said combustion and unreacted oxygen from the second stream of oxidant, that is at a temperature of at least 1500 F and fills the interior space of the port.

* * * * *